US007008552B2

(12) United States Patent
Ohkuma

(10) Patent No.: US 7,008,552 B2
(45) Date of Patent: Mar. 7, 2006

(54) METHOD FOR MAKING THROUGH-HOLE AND INK-JET PRINTER HEAD FABRICATED USING THE METHOD

(75) Inventor: Norio Ohkuma, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 53 days.

(21) Appl. No.: 10/600,763

(22) Filed: Jun. 23, 2003

(65) Prior Publication Data

US 2004/0084403 A1 May 6, 2004

(30) Foreign Application Priority Data

Jul. 4, 2002 (JP) ............................ 2002-195528

(51) Int. Cl.
*G01D 15/00* (2006.01)
*G11B 5/127* (2006.01)

(52) U.S. Cl. ........................................................ 216/27

(58) Field of Classification Search .................. 216/17, 216/27, 41, 46; 438/21, 700, 705, 740; 29/890.1; 347/20, 40, 44, 47, 54, 55, 56, 65, 68, 71
See application file for complete search history.

(56) References Cited

U.S. PATENT DOCUMENTS

| | | | | |
|---|---|---|---|---|
| 5,141,596 | A * | 8/1992 | Hawkins et al. | 216/2 |
| 6,113,222 | A | 9/2000 | Ohkuma | |
| 6,128,052 | A | 10/2000 | Asaba et al. | |
| 6,139,761 | A | 10/2000 | Ohkuma | |
| 6,143,190 | A | 11/2000 | Yagi et al. | |
| 6,305,080 | B1 | 10/2001 | Komuro et al. | |

FOREIGN PATENT DOCUMENTS

| | | |
|---|---|---|
| EP | 1 038 676 | 9/2000 |
| JP | 6-347830 | 12/1994 |
| JP | 9-11479 | 1/1997 |
| JP | 10-181032 | 7/1998 |

OTHER PUBLICATIONS

E. Bassous, “Fabrication of Novel Three-Dimensional Microstructures by the Anisotropic Etching of (100) and (110) Silicon,” IEEE Transactions on Electron Devices, Oct., 1978, vol. ED-25, No. 10, pp. 1178-1185.

(Continued)

*Primary Examiner*—Parviz Hassanzadeh
*Assistant Examiner*—Roberts Culbert
(74) *Attorney, Agent, or Firm*—Fitzpatrick Cella Harper & Scinto

(57) ABSTRACT

A method for making a through-hole in a silicon substrate includes the steps of forming a high-impurity-concentration region in the periphery of a through-hole-forming region at a first surface of the silicon substrate, forming an etching stop layer over the through-hole-forming region and the high-impurity-concentration region, forming a mask layer having an opening at a second surface of the silicon substrate, etching the silicon substrate at the opening through the mask layer until the etching stop layer is exposed to the second surface, further etching the silicon substrate until the etched portion extends to the high-impurity-concentration region, and removing the etching stop layer at least at the portion exposed to the second surface. Also disclosed is an ink-jet printer head including an ink supply port fabricated using the method for making the through-hole.

7 Claims, 5 Drawing Sheets

OTHER PUBLICATIONS

Patent Abstracts of Japan, vol. 1999, No. 12, Oct. 29, 1999 (JP 11-204751, Jul. 30, 1999).

Patent Abstracts of Japan, vol. 2000, No. 4, Aug. 31, 2000 (JP 2000-021850, Jan. 21, 2000).

* cited by examiner

METHOD FOR MAKING THROUGH-HOLE AND INK-JET PRINTER HEAD FABRICATED USING THE METHOD

BACKGROUND OF THE INVENTION

1. Field of the Invention

The present invention relates to a method for making through-holes in a silicon substrate and an ink-jet printer head fabricated by the method. More particularly, the present invention aims at improving the formation yield of the through-holes.

2. Description of the Related Art

Recently, intensive research has been conducted regarding methods for making through-holes in silicon substrates by isotropic or anisotropic etching, and application of the methods to devices.

In Japanese Patent Laid-Open No. 10-181032, the applicant of the present invention discloses a method for making a through-hole, in which a sacrificial layer is formed on a silicon substrate before making the through-hole, and thereby, the size of the through-hole is controlled and the positional accuracy of the through-hole is improved. Furthermore, as an improvement of the method disclosed in Japanese Patent Laid-Open No. 10-181032, the applicant of the present invention also discloses a method in which a protective layer is disposed on the sacrificial layer to improve the formation yield of through-holes, or a method in which the sacrificial layer is embedded in the silicon substrate, and thereby, the size of the through-hole is further controlled and the positional accuracy of the through-hole is further improved. In Japanese Patent Laid-Open No. 6-347830, the applicant of the present invention discloses that a silicon nitride film formed by low-pressure vapor deposition (LP-SiN) is effective as an etching stop layer in the through-hole formation process. In Japanese Patent Laid-Open No. 9-11479, the applicant of the present invention also discloses a method in which a through-hole is made in a silicon substrate, and the through-hole is used as an ink supply port of an ink-jet head.

However, although the positional accuracy of the through-hole is greatly improved by the sacrificial layer disposed on the silicon substrate, cracks may occur in the etching stop layer when the hole penetrates the silicon substrate, resulting in defects, such as intrusion of the etchant into the surface of the substrate.

FIGS. 4A to 4E are sectional views showing steps in a conventional method for making a through-hole using a sacrificial layer. Referring to FIG. 4A, a sacrificial layer 402 composed of polycrystalline silicon (hereinafter referred to as poly-Si) and an etching stop layer 403 are disposed on a first surface of a silicon substrate 401, and an etching mask layer 404 is disposed on a second surface of the substrate 401.

In this method, as shown in FIG. 4B, a through-hole is made from the second surface to reach the inside of the sacrificial layer 402. When the hole penetrates the substrate 401, the sacrificial layer 402 is immediately dissolved in the etchant, and anisotropic etching starts from the edge of the sacrificial layer 402. Finally, the through-hole has a shape shown in FIG. 4C.

In anisotropic etching of the {100} plane of a silicon substrate, in theory, etching stops at the {111} plane, and a through-hole is made at an angle of 54.7° relative to the plane of the substrate. The size and position of the through-hole are uniformly set. In practice, in many cases, due to uneven thickness of the silicon substrate and crystal defects of the silicon substrate, the size and position of the through-hole vary to some extent. In particular, when a through-hole is made after a semiconductor element is preliminarily embedded in a silicon substrate, in some cases, the crystal defects are increased by thermal hysteresis in the semiconductor formation process, resulting in an increase in variations in the size and position of the through-hole.

In the method using the sacrificial layer, since the opening shape and the position of the through-hole can be controlled by the placement of the sacrificial layer, fabrication can be performed more accurately. However, in the method described above, since the etching stop layer is disposed on the sacrificial layer, as shown in FIG. 4D, coverage at the corner is insufficient, and cracks occur more easily, resulting in a decrease in the yield. If the etchant intrudes into the surface of the substrate due to the cracks, damage is caused because, in order to save time for etching, the silicon substrate is usually etched using a strong alkali solution, such as a tetramethylammonium hydroxide (TMAH) or potassium hydroxide (KOH) solution, at a temperature of 80° C. or more.

In the method in which the sacrificial layer is embedded in the silicon substrate, the number of fabrication steps is remarkably increased because of restrictions on masks in the presence of the embedded section.

In order to eliminate the defects, a protective film 410 may be formed above the corner (refer to FIG. 4E) so that the etchant is prevented from intruding into the surface of the substrate even if cracks occur at the corner. In such a case, however, the number of fabrication steps increases because a step of forming the protective layer is included.

SUMMARY OF THE INVENTION

It is an object of the present invention to provide a method for making through-holes in which cracks are easily prevented from occurring in the etching stop layer, thus improving the formation yield of the through-holes. It is another object of the present invention to provide an ink-jet printer head fabricated using the method.

In one aspect of the present invention, a method for making a through-hole in a silicon substrate includes the steps of forming a high-impurity-concentration region in the periphery of a through-hole-forming region at a first surface of the silicon substrate; forming an etching stop layer over the through-hole-forming region and the high-impurity-concentration region; forming a mask layer having an opening on a second surface of the silicon substrate, the second surface being opposite to the first surface; etching the silicon substrate at the opening through the mask layer until the etching stop layer is exposed to the second surface; further etching the silicon substrate until the etched portion extends to the high-impurity-concentration region; and removing the etching stop layer at least at the portion exposed to the second surface.

In another aspect of the present invention, an ink-jet printer head includes an ink supply port fabricated using the method for making the through-hole described above.

In accordance with the present invention, the positional accuracy of the through-hole can be greatly improved. Cracks do not occur in the etching stop layer, and the yield of the through-holes can be improved by the simple technique.

Further objects, features and advantages of the present invention will become apparent from the following description of the preferred embodiments with reference to the attached drawings.

DESCRIPTION OF THE PREFERRED EMBODIMENTS

In accordance with the present invention, by forming a high-impurity-concentration region in a silicon substrate, it is possible to control the size of the through-hole more easily compared to a case in which a sacrificial layer is used. It is also possible to achieve a simple method for forming the through-hole without causing cracks. The present invention is based on intensive research of the present inventor.

A method for making a through-hole of the present invention will be described in which a high-impurity-concentration region is disposed in the periphery of a through-hole-forming region of a silicon substrate with a <100> crystal orientation.

Figure 1A:
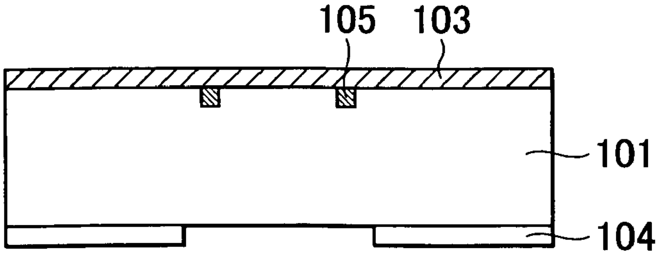
FIGS. 1A to 1E are sectional views showing the steps for making a through-hole in the present invention.

In a step shown in FIG. 1A, a high-impurity-concentration region 105 is embedded in the periphery of a through-hole-forming region in a silicon substrate 101, and an etching stop layer 103 is disposed over the high-impurity-concentration region 105. An etching mask layer 104 is disposed on a back surface of the substrate.

Figure 1B:
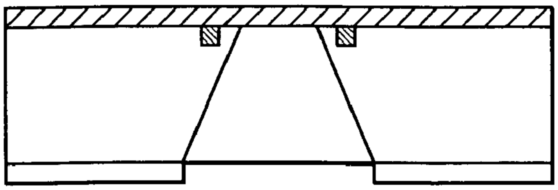

After etching is performed, a through-hole is formed as shown in FIG. 1B. The through-hole which has just penetrated the silicon substrate 101 is formed inside the high-impurity-concentration region 105.

Figure 1C:
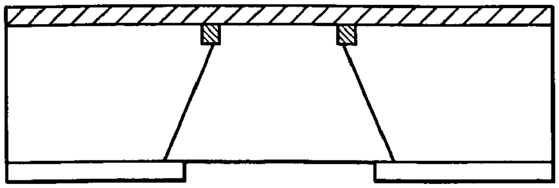

Next, as shown in FIG. 1C, by overetching, the through-hole is expanded by side-etching to reach the high-impurity-concentration region 105.

Figure 1D:
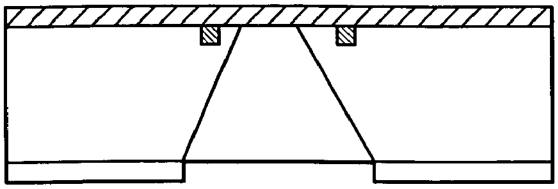

The present inventor has found that the side-etching rate becomes extremely low when side-etching of the through-hole reaches the high-impurity-concentration region 105. That is, since the side-etching rate is decreased to approximately ⅕ to 1/10, even if the size of the through-hole varies when the though-hole penetrates the substrate in the step shown in FIG. 1B due to the uneven thickness of the silicon substrate and crystal defects (refer to FIG. 1D), by extending the through-hole to the high-impurity-concentration region 105 by overetching, the amount of side-etching extremely decreases. Consequently, the size of the resultant through-hole becomes substantially uniform as shown in FIG. 1C.

As described above, by forming the high-impurity-concentration region in the silicon substrate, the size of the through-hole can be controlled. In contrast to the method in which the sacrificial layer is disposed on the silicon substrate, since the etching stop layer is formed flat, cracks do not occur.

Preferably, the high-impurity-concentration region has an impurity concentration of 1.times.10.sup.19/cm.sup.3 or more, and more preferably 7.times.10.sup.19/cm.sup.3 or more.

A method is disclosed in IEEE Trans. on Electron Devices, Vol. ED-25, No. 10, 1978, pp. 1178–1185, in which an impurity diffusion layer is formed as an etching stop layer to fabricate an ink-jet nozzle, using the fact that a diffusion layer with an impurity concentration of 7.times.10.sup.19/cm.sup.3 or more is not etched by an anisotropic etchant. Since the impurity diffusion layer is used as the etching stop layer, if a through-hole is made, cracks are caused by the stress of the etching stop layer when the hole penetrates the substrate. Therefore, it is difficult to use the method described above for making a through-hole. Additionally, at an impurity concentration of 7.times.10.sup.19/cm.sup.3 or more, the layer is not etched by the etchant. In the present invention, an impurity diffusion layer is used to decrease the side-etching rate, and this effect is achieved even by an impurity concentration of 1 .times. 10.sup. 19/cm.sup.3 or more.

In the present invention, preferably, the impurity diffusion layer has a width of 1 to 20 $\mu$m and a depth of 1 to 3 $\mu$m. The width and depth of the impurity diffusion layer may be set appropriately depending on the application of the through-hole.

Examples of preferred impurities used include boron, phosphorus, arsenic, and antimony. The impurities used in the present invention are the same as those used for usual semiconductor elements. When a through-hole is made in a substrate provided with a semiconductor element, in the process of forming an impurity diffusion layer for the semiconductor element, a high-impurity-concentration layer for controlling the size of the through-hole may be formed simultaneously.

Figure 1E:
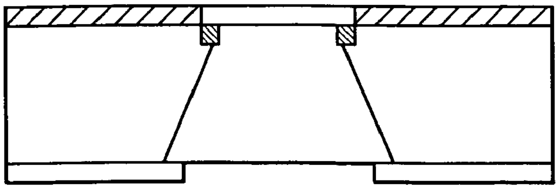

Finally, as shown in FIG. 1E, the etching stop layer 103 is properly removed from the substrate provided with a through-hole in which the size is controlled as described above.

Preferably, the etching stop layer is composed of a silicon nitride film formed by low-pressure vapor deposition (LP-SiN).

EXAMPLES

The present invention will be described in more details based on Examples below.

Example 1

Figure 2A:
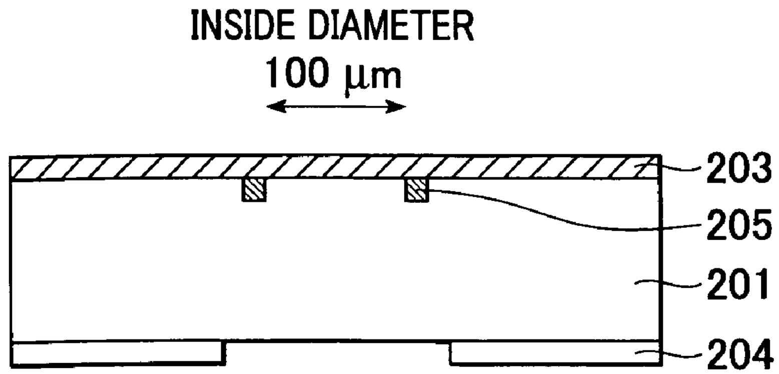
FIGS. 2A to 2C are sectional views showing the steps for making a through-hole in Example 1 of the present invention.
Figure 2B:
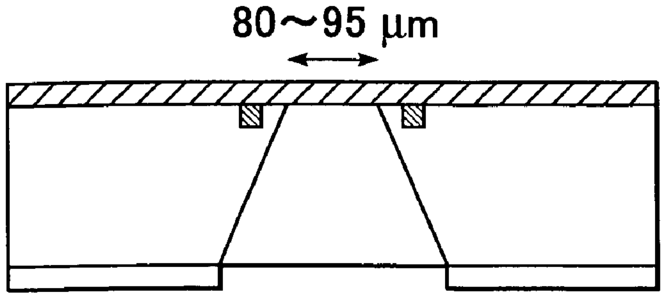
Figure 2C:
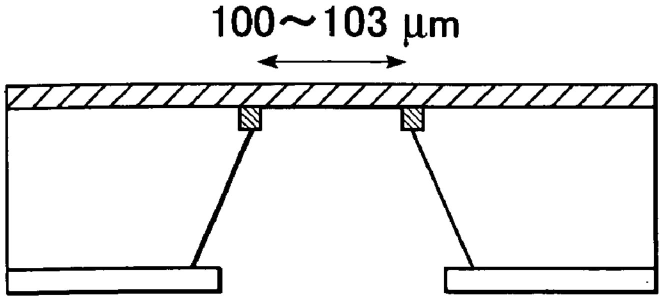

FIGS. 2A to 2C are sectional views showing the steps for making a through-hole in Example 1 of the present invention.

In the step shown in FIG. 2A, as an impurity diffusion layer 205, a region with a width of 3 $\mu$m, a depth of 1 $\mu$m, and an inside diameter of 100 $\mu$m was formed in a silicon substrate 201 with a <100> crystal orientation (625 $\mu$m thick), and as an etching stop layer 203, an LP-SiN film was deposited at a thickness of 2,500 Å. In the impurity diffusion layer 205, boron (B) was diffused at 7.times.10.sup.19/cm.sup.3. An anisotropic etching mask 204 composed of $SiO_2$ (4,000 Å thick) was disposed on the back surface of the silicon substrate 201. The number of the impurity diffusion layers 205 formed in the silicon substrate 201 was 300.

Next, the silicon substrate 201 was subjected to anisotropic etching in a 22% TMAH aqueous solution at 83° C. for 960 min. Under these conditions, the etching rate was approximately 39 to 40 $\mu$m/Hr. Additionally, the front surface of the substrate was protected with a jig to prevent the TMAH aqueous solution from intruding into the surface. At this stage, a hole penetrated the silicon due to anisotropic etching, and the width of the hole was 80 to 95 $\mu$m (refer to FIG. 2B).

In order to perform an overetch of the substrate, the substrate was again subjected to anisotropic etching for 30 min. Under this condition, the side-etching rate was approximately 20 μm/Hr (each side). When the overetch was performed, the through-hole was enlarged by side-etching and stopped in the vicinity of the impurity diffusion layer 205. The width of the through-hole was 100 to 103 μm (refer to FIG. 2C).

As described above, when the silicon substrate is subjected to anisotropic etching only, the range of variation in the width of the through-hole is approximately 15 μm. In contrast, in accordance with the method of this example, the range of variation is approximately 3 μm, and the width of the through-hole is evidently controllable.

Furthermore, in all of the 300 impurity diffusion layers 205 in the silicon substrate, cracks were not observed. That is, since the etching stop layer is formed on a flat surface of the substrate, defects, such as cracks, do not occur in the etching stop layer after anisotropic etching is performed.

Example 2

In Example 2 of the present invention, a method for making a through-hole of present invention was applied to the formation of an ink supply port of an ink-jet head.

Figure 3A:
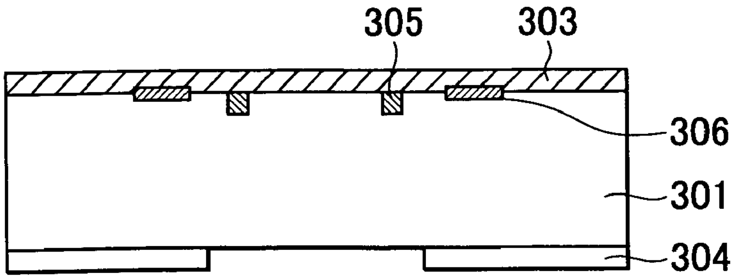
FIGS. 3A to 3G are sectional views showing the steps for forming an ink supply port of an ink-jet head using a method for making a through-hole in Example 2 of the present invention.
Figure 3B:
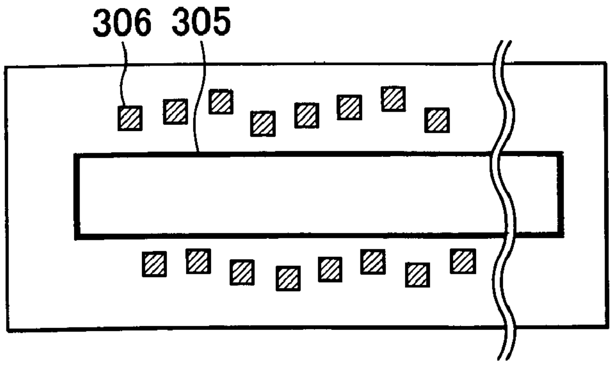

As shown in FIG. 3A which is a sectional view and in FIG. 3B which is a top plan view, electrothermal conversion elements 306 composed of TaN are disposed and, as an impurity diffusion layer 305, a region with a width of 3 μm, a depth of 1 μm, and an interior size of 100×11,500 μm was formed in a silicon substrate 301 with a <100> crystal orientation (625 μm thick). Furthermore, as an etching stop layer 303, an LP-SiN film was deposited at 3,000 Å. In the impurity diffusion layer 305, boron (B) was diffused at 7.times.10.sup.19/cm.sup.3. An anisotropic etching mask 304 composed of $SiO_2$ (4,000 Å thick) was disposed on the back surface of the silicon substrate 301. The electrothermal conversion elements 306 were connected to control signal lines and a drive circuit built in the substrate as a semiconductor element for driving the electrothermal conversion elements 306 (not shown in the drawing). The electrothermal conversion elements 306 in the quantity of 128 pieces were arrayed along each long side of the impurity diffusion layer 305 (256 pieces along both long sides) at a 300 DPI pitch. The structure shown in FIG. 3B was considered as one chip, and 180 chips were arrayed on the silicon substrate 301.

Figure 3C:
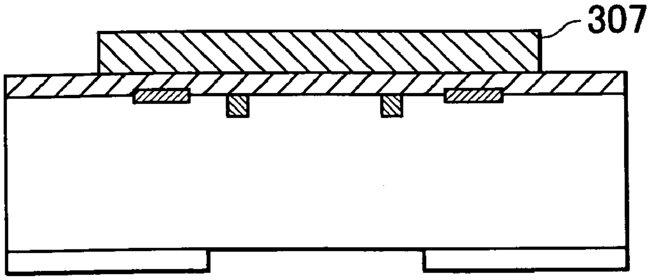

Next, as shown in FIG. 3C, a positive resist (ODUR: trade name; manufactured by Tokyo Ohka Kogyo Co., Ltd.) for forming an ink passage 307 was disposed on the silicon substrate 301 by patterning.

Figure 3D:
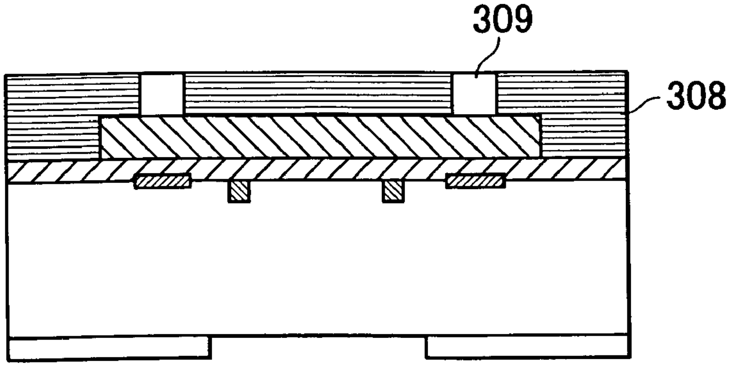

As shown in FIG. 3D, a negative resist 308 with a composition shown in Table 1 below was applied onto the ink passage 307, and a discharge nozzle 309 was formed by patterning.

TABLE 1

| | | |
|---|---|---|
| Epoxy resin | EHPE (manufactured by Daicel Chemical Industries, Ltd.) | 100 parts |
| Additive resin | 1,4-HFAB (manufactured by Central Glass Co., Ltd.) | 20 parts |
| Silane coupling agent | A-187 (manufactured by Nippon Unicar Co., Ltd.) | 5 parts |
| Cationic photopolymerization catalyst | SP170 (manufactured by Asahi Denka Co., Ltd.) | 2 parts |
| Coating solvent | Methyl isobutyl ketone | 30 parts |
| | Diglyme | 20 parts |

Figure 3E:
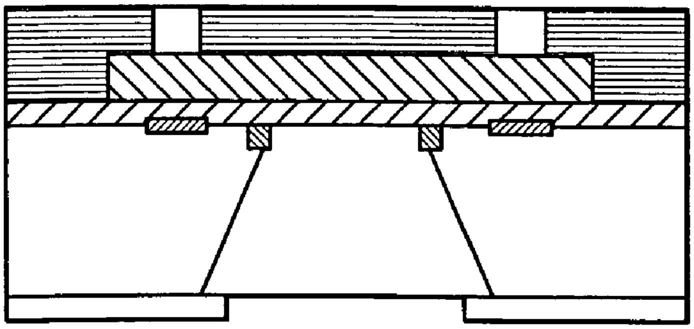

Next, the silicon substrate 301 provided with the discharge nozzle 309 was subjected to anisotropic etching in a 22% TMAH aqueous solution at 83° C. for 990 min. Additionally, the front surface of the substrate was protected with a jig to prevent the TMAH aqueous solution from intruding into the surface. FIG. 3E is a sectional view after anisotropic etching is performed.

Figure 3F:
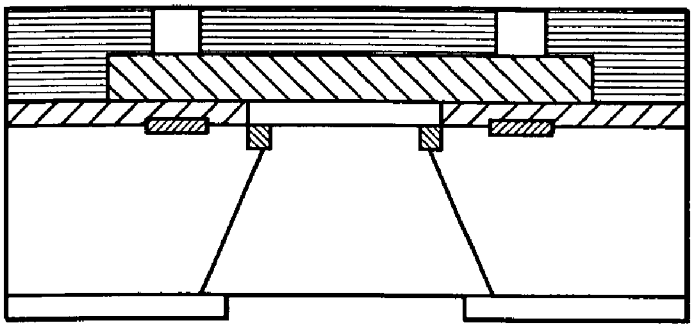

As shown in FIG. 3F, with the front surface of the silicon substrate 301 being protected, the etching stop layer 303 was removed from the back surface of the substrate 301 by chemical dry etching (CDE) using $CF_4$ gas, and a through-hole was thereby completed.

Figure 3G:
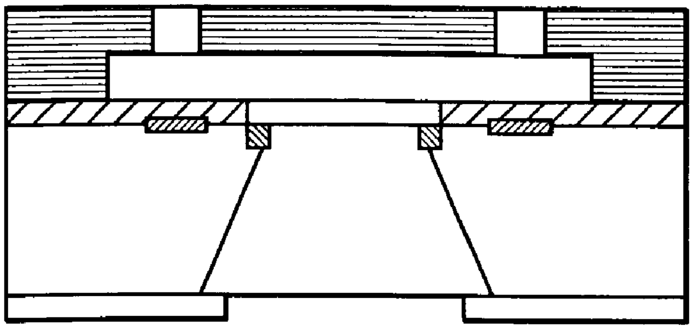
Figure 4A:
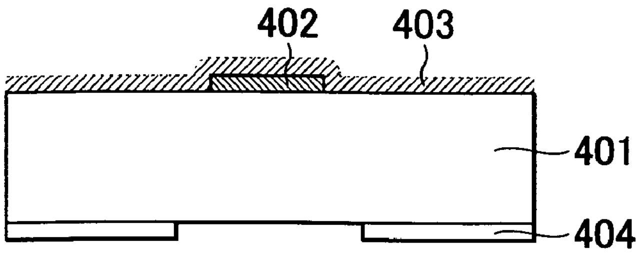
FIGS. 4A to 4E are sectional views showing the steps for making a through-hole using a sacrificial layer in a conventional method.
Figure 4B:
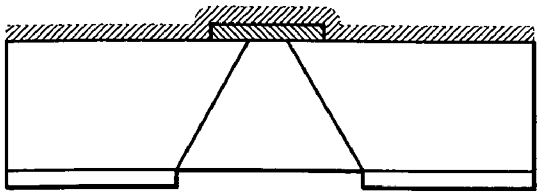
Figure 4C:
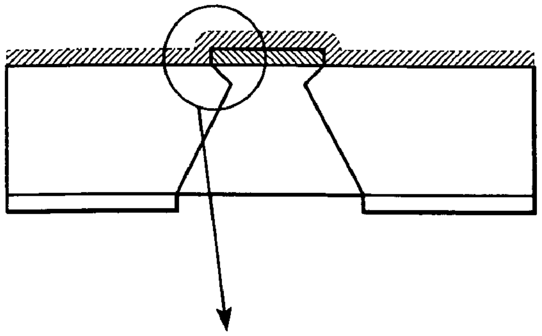
Figure 4D:
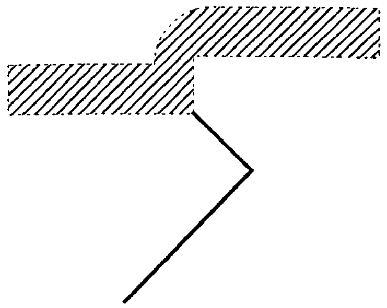
Figure 4E:
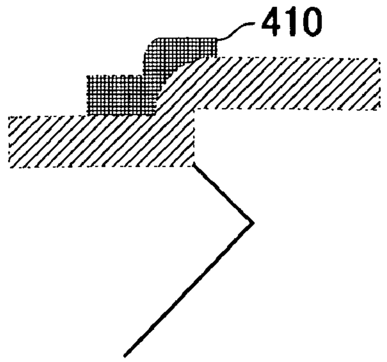

As shown in FIG. 3G, the positive resist in the shape of the ink passage 307 was removed, and an ink-jet head was thereby completed. At this stage, with respect to all the chips, cracks and abnormalities in the etching stop layers 303 were checked with a microscope, and no defects were observed.

Furthermore, the width in the latitudinal direction of the through-hole was measured, and the measured width was in the range of 102 to 106 μm. As is obvious from the result, the through-holes were formed remarkably accurately. In the ink-jet head, the discharge frequency depends on the refilling time of inks, and the distance between the through-hole and the discharge nozzle is one of the factors in determining the refilling time. Therefore, the through-hole is preferably close to the discharge nozzle as much as possible. In the present invention, since the position of the through-hole is uniformly set by the impurity diffusion layer 305, it is possible to fabricate an ink-jet head having stable discharging performance.

An electric current was applied to the resultant ink-jet head, and a printing test was carried out using an ink with a composition shown in Table 2 below. As a result, printing was performed satisfactorily.

TABLE 2

| | |
|---|---|
| Ethylene glycol | 5 parts |
| Urea | 3 parts |
| Isopropyl alcohol | 2 parts |
| Black dye | 3 parts |
| Water | 87 parts |

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A method for making a through-hole in a silicon substrate comprising the steps of:

forming a high-impurity-concentration region at a first surface of the silicon substrate that continuously surrounds only the periphery of a through-hole-forming region;

forming an etching stop layer over the through-hole-forming region and the high-impurity-concentration region;

forming a mask layer having an opening on a second surface of the silicon substrate, the second surface being opposite to the first surface;

etching the silicon substrate at the opening through the mask layer until the etching stop layer is exposed to the second surface, while the high-impurity-concentration region is not exposed to the second surface;

subsequently, further etching the silicon substrate until the etched portion extends to the high-impurity-concentration region; and removing the etching stop layer at least at the portion exposed to the second surface.

2. A method for making a through-hole according to claim 1, wherein the high-impurity-concentration region has an impurity concentration of 1.times.10.sup.19/cm.sup.3 or more.

3. A method for making a through-hole according to claim 2, wherein the high-impurity-concentration region has an impurity concentration of 7.times.10.sup.19/cm.sup.3 or more.

4. A method for making a through-hole according to claim 1, wherein the impurity is selected from the group consisting of boron, phosphorus, arsenic, and antimony.

5. A method for making a through-hole according to claim 1, wherein the high-impurity-concentration region has a width of 1 to 20 μm and a depth of 1 to 3 μm.

6. A method for making a through-hole according to claim 1, wherein the high-impurity-concentration region is formed by forming an impurity diffusion layer in the first surface of the silicon substrate.

7. A method for making a through-hole according to claim 1, wherein the etching stop layer comprises a silicon nitride film formed by low-pressure vapor deposition (LP-SiN).

* * * * *